Patented Apr. 3, 1945

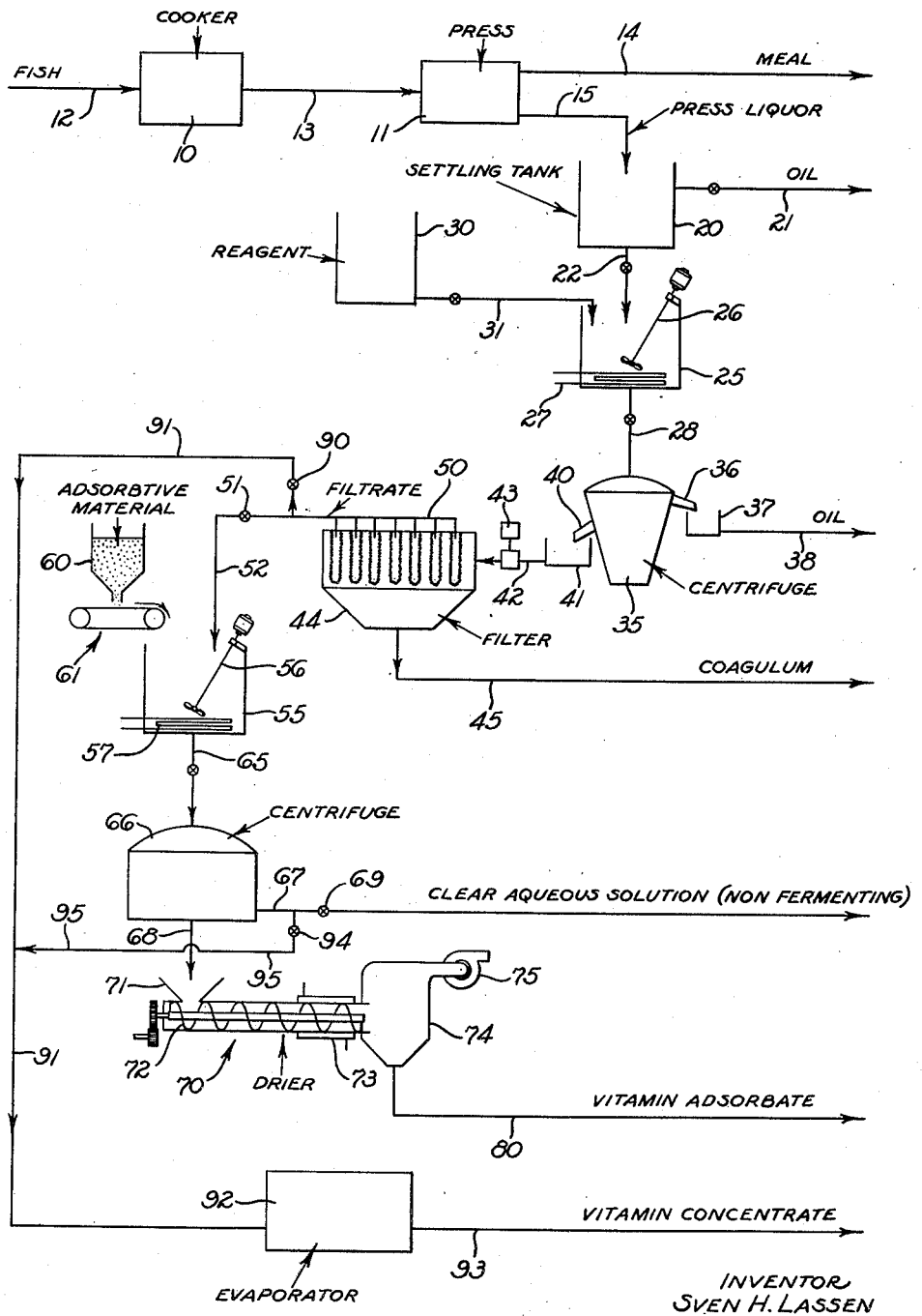

2,372,677

UNITED STATES PATENT OFFICE 2,372,677

PROCESS FOR TREATING FISH PRESS LIQUOR

Sven H. Lassen, Los Angeles, Calif., assignor, by direct and mesne assignments, of one-half to Phillip R. Park, Inc., San Pedro, Calif., a corporation of California, and one-half to Van Camp Sea Food Company, Inc., Terminal Island, Calif., a corporation of California Application September 11, 1939, Serial No. 294,289

8 Claims. (Cl. 167—81)

This invention relates to the treatment of press liquor expressed from fish in the manufacture of fish meal, and relates more particularly to a process for the treatment of press liquor to stabilize it against decomposition and for the recovery of various products therefrom.

In the manufacture of fish meal whole fish of one or more of the small species, sardines, herring, mackerel, and menhaden, are cooked and then sent through a press in which the fluid constituents are removed as far as possible, leaving the solid constituents as a meal which, when dried, forms a valuable addition to stock and poultry feed. The expressed fluid is largely aqueous but contains some oil which is recovered by settling while still at an elevated temperature. Subsequent to the skimming of the oil from the settled press liquor or "stick," as it is called in the art, the latter is sent to waste. The disposal of this stick, however, is a very difficult problem, since immediately on cooling fermentation sets in, proceeding with extreme rapidity in the production of nauseous odors. The dumping of this material either before or after fermentation starts is, in most instances, specifically prohibited in bays and harbors. Consequently, the handling of this material, which in large plants may be produced at the rate of 6,000 gallons per hour or higher, has necessitated the use of pipelines for conveying the liquor a substantial distance to sea before dumping it.

It is one of the objects of my invention to convert this objectionable or potentially objectionable press liquor into an unobjectionable, non-fermenting solution which may be readily disposed of by dumping in the waters of the harbor or bay, or which may be further utilized or processed as desired.

In my copending application, Serial No. 129,648 (now Patent 2,188,008), I have disclosed my discovery that such press liquor is a very rich and valuable source of water soluble vitamins $B_1$ and G, and indeed the whole B complex, and I have there disclosed a process for the recovery of these vitamins from the press liquor. This application is a continuation-in-part of the aforesaid application and has as an object the providing of an improved process for the recovery of vitamins from press liquor, and the providing of valuable and novel compositions containing vitamins $B_1$ and G.

I have furthermore discovered that there is a valuable portion of oil intimately associated or bound with the press liquor so that it is not recoverable as free oil in the settling or centrifuging processes as normally practiced.

It is an object of the present invention to increase the recovery of oil from press liquor, and more particularly to provide a process for freeing the bound oil whereby it may be economically recovered to form a valuable additional yield of oil.

The press liquor as normally wasted also contains valuable quantities of protein material suitable for animal food and adapted for incorporation in the main bulk of fish meal.

It is a further object of my invention to recover proteinaceous material from the press liquor as normally wasted.

In its broadest aspect, my invention comprises the chemical coagulation of readily coagulable proteins contained in the press liquor whereby the tendency of the latter toward fermentation or enzymolysis is stopped or inhibited, whereby bound oil is freed and rendered susceptible to centrifugal or gravitational separation, whereby the proteins are converted into a coagulated form easily separable from the liquor and suitable for incorporation in the meal, and whereby a clarified serum is obtained suitable for working up into vitamin concentrates. The formation of such vitamin concentrates by adsorptive or evaporative treatment of the serum also constitutes a part of my invention.

Further objects and aspects of the invention will become apparent in the following discussion of the drawing, which is a flow diagram indicating schematically one embodiment of my process.

Referring to the drawing, a cooker 10 and a press 11 are indicated in a conventional manner, together with a conveying means 12 for bringing the raw whole fish into the cooker, a conveying means 13 for transferring the cooked fish into the press, and a conveying means 14 for removing the meal from the press. The press liquor flows through a pipe 15 into a settling tank 20 provided with a valved draw-off line 21 for removing oil, and a valved draw-off line 22 for withdrawing the aqueous liquor. The latter flows into a tank 25 provided with a motor-driven stirring device 26, a heating coil 27, and a valved withdrawal line 28. The tank 25 is arranged to receive the liquor flowing through the line 22, and to receive chemical reagents brought from a tank 30 by means of a valved transfer line 31.

The treated effluent from the tank 25 passes through the line 28 to a centrifuge 35 of the type adapted to skim or remove light density liquids, such as oil, from more dense liquids such as water. The oil is withdrawn from the centrifuge 35 through a spout 36, collected in a basin 37, and is withdrawn as one of the products of my process through a line 38. The heavier aqueous liquid is withdrawn through a spout 40 emptying into a basin 41, whence it is transferred by means of a line 42 and pump 43 to a filter 44. The solids removed by the filter collect in the bottom thereof and are periodically or continuously removed by means of a conveying device 45 and constitute the coagulum which is one of the products of my process.

The filtrate from filter 44 is collected in a header 50 whence it may be transferred by means of a valve 51 and line 52 to a tank 55. This tank is equipped with a motor-driven stirrer 56 and a heating coil 57 and is arranged to receive adsorptive material stored in a bin 60 and conveyed to the tank 55 by means of a feeding device 61.

The contents of the tank 55 may be withdrawn through a valved withdrawal line 65 and introduced into a centrifuge 66 which is of the type adapted to separate solids from liquids. The centrifuge is provided with a liquid withdrawal line 67 and a solid withdrawal line 68. The liquid in the line 67 may be withdrawn from the process through a valve 69 to constitute one of the products of my process, namely, a clear aqueous non-fermenting solution.

The solids transferred through line 68 are introduced into a dryer 70, which comprises a feed hopper 71, and a screw conveyor 72 jacketed in part at least by a heating jacket 73 and arranged to convey the solid material into a collecting bin 74, the latter being provided with a suction fan 75 adapted to draw air through the conveyor to aid in the drying process. The dry solids collecting in the bin 74 are removed by means of a conveying device 80 and constitute one of the products of my process, namely a vitamin adsorbate.

An alternative treatment is provided for the filtrate from the filter 44. By closing the valve 51 and opening a valve 90 in a transfer line 91, the filtrate may be brought to an evaporator 92, preferably of the vacuum type, in which it may be concentrated to any desired degree and withdrawn through a line 93 to constitute one of the products of my process, namely, a vitamin concentrate. Or, if desired, the evaporator may be employed to concentrate the liquid effluent from the centrifuge 66; for example, by closing the valve 69 and opening a valve 94 in a transfer line 95 leading from the line 67 to the line 91.

Considering these operations in greater detail, it may be pointed out that the first few steps are conventional, namely, the steps of cooking, pressing, and settling. In the fish meal industry the raw material is constituted by whole small fish of one or more of the four species; sardine, herring, mackerel, and menhaden. These whole small fish are cooked, or partially cooked, at a temperature of around 200° F. in a suitable cooker, such as the cooker 10, and then sent directly to the press 11, which is usually a press of the screw-conveyor type, where the aqueous and liquid constituents are expelled to produce a solid meal, removed as shown by numeral 14. The effluent press liquors are usually passed through a screen which serves to remove coarse solids and are transferred through a transfer pipe, such as the pipe 15, into a settling tank.

The hot liquor which is at a temperature of about 200° F., or somewhat higher, contains appreciable quantities of oil which may be removed by settling at this elevated temperature, so that in the settling tank the oil rises to the surface and may be withdrawn. Alternatively, the hot press liquor may be subjected to various other separatory processes designed to remove the free oil, such as passage through a centrifuge or flow through a series of skimming tanks in which the liquor is caused to flow under baffles or weirs which hold back the oil rising to the surface of the liquor.

When dealing with liquor expressed from sardines, the oil thus recoverable by hot settling or skimming will usually amount to about 15% of the liquor as expressed. This sardine oil is a commercially valuable oil and constitutes, together with the fish meal, the two hitherto marketable products produced by the fish meal industry.

The remaining product, namely, the press liquor, has not only been hitherto unmarketable, but its disposal has constituted a very serious burden on the industry. This cloudy, aqueous liquid, while sterile and free from bacteria and stable at temperatures in excess of 180° F., very rapidly decomposes when cooled to lower temperatures. For example, at 80° F., the aqueous liquor will decompose in the course of a few hours with a concomitant production of extremely noxious odors. In view of this characteristic, the discharge of this material into bays and rivers has been expressly prohibited by law, and it has been necessary as a consequence to provide pipe lines for transfer of this material out to sea before dumping. When it is considered that about 150 gallons of this material are obtained for every 25 gallons of sardine oil, or similar small fish oil, and that in the usual size plant from 6 to 10 thousand gallons of this liquor may be produced per hour, the magnitude of this disposal problem may be appreciated.

As a result of extensive experimental studies on this material, I have ascertained the following with regard to its characteristics and composition, much of which is disclosed in my copending application.

I have ascertained that the decomposition of the press liquor is attributable to the presence of proteolytic enzymes. I have further ascertained that these enzymes can be removed or inhibited in their effect by the chemical coagulation of the readily coagulable proteins present in the press liquor. The skimmed press liquor contains about 6% of dissolved and suspended proteins. By the addition of a chemical coagulant adapted to precipitate proteins, and in amount sufficient to precipitate only the readily coagulable proteins, I obtain a clear liquor which shows little or no tendency toward enzymolysis, so that it can be kept for days or even months without substantial decomposition whereas the untreated liquor will decompose in the matter of a few hours.

By such chemical coagulation the residual protein content is usually reduced to about 3%, this protein content being all soluble in the water and being constituted for the most part by serum albumens which are not coagulable by heat and which are substantially more resistant toward chemical coagulation than the readily coagulable proteins which are precipitated by the action of the coagulant.

I have thus found that the simple step of chemically coagulating the readily coagulable proteins results in the stabilization of the potentially very noxious press liquor, so that its disposal no longer presents a serious problem. However, I find that the disposal of this material as waste is no longer justified because of the many valuable products which I have found are readily recoverable therefrom.

As indicated in my copending application, I have found the press liquor to be an extremely rich source of vitamin B complex. By methods of biological assays on rats and chicks, by spectrophotometric analyses, and, in the case of flavin, by isolation of the crystalline vitamin itself, I have determined that press liquor contains from 50 to 80 Chase-Sherman units of the anti-neuritic vitamin $B_1$ per 100 grams of press liquor and from 60 to 125 Bourquin-Sherman units of growth-promoting flavin per 100 grams of press liquor. This concentration of flavin may be compared with the 30-40 units per 100 grams found in milk whey, which constitutes the present commercial source of flavin.

I have not only demonstrated the presence of $B_1$ and flavin in the indicated quantities, but I have also ascertained the presence of other factors which are associated with these vitamins in the so-called vitamin B complex. Thus, I have demonstrated the presence of the $B_6$ factor by curing florid dermatitis in rats and also of the presence of a further vitamin B factor by curing the curled-toe paralysis in chicks. I have furthermore obtained indications which permit the conclusion that the entire group B complex is present in press liquor.

I have also found in connection with my vitamin preparations obtained from fish press liquor that animals receiving such preparations in their diet show a consistently greater rate of growth than can be predicated on the concentration of growth factors as determined by non-biological methods of assay, which is indicative of the presence of growth-promoting factors as yet unidentified.

Many other physiologically active materials are present in the press liquor containing as it does substantially all of the water soluble constituents of the entire fish. For example, the press liquor contains from 0.8 to 1% of mineral salts which are distributed as to proportions in precisely the ratios required by living organisms. The press liquor also contains glandular secretions of the fish including various water-soluble hormones.

Press liquor is thus seen to be a very valuable source of vitamins and similar food supplements and in my copending application I have described and claimed a process for the recovery of such vitamins, such process having as its initial step the chemical coagulation of the readily coagulable proteins to inhibit enzymolysis and obtain a material stabilized against the potential decomposition that would otherwise prove such a very serious objection in working the press liquor up into food supplements.

As the result of further research, I have now developed a better and more economical process for coagulation of the proteins and prevention of enzymolysis, and also a more economical and convenient method for the recovery of vitamins in subsequent steps. In addition I have found that the press liquor as hitherto wasted contains from ½ to 2% of oil which I am able to recover in the practice of my new process. The economic value of the oil thus recovered is more than sufficient to pay for all of the processing steps, including the vitamin recovery. I have furthermore found that the coagulated proteins constitute another valuable product of my process and by their recovery and incorporation with the fish meal, I am able to substantially increase the overall yield of the latter.

The above description of the press liquor has served to generally characterize the raw material of my process; namely, the skimmed press liquor after the free or easily separable oil has been removed therefrom. It should further be noted that this press liquor contains an additional amount of bound or tightly emulsified oil, the droplets of which are stabilized by a proteinaceous emulsifying agent to the extent that they are not separable from the liquor by the ordinary settling process, nor even by centrifuging. I have found that the step of chemical coagulation of the readily coagulable protein serves to free or destabilize this emulsified oil, doubtless by precipitation or modification of the emulsifying agent.

Returning again to the discussion of the operations indicated in the drawing, the skimmed press liquor is withdrawn from the tank 20 through pipe 22 and transferred to the treating tank 25. Normally there will be some drop in temperature of the press liquor during settling and where it was originally 200 to 210° F., it may be received in the tank 25 at a temperature of 180° or somewhat lower. I provide a heating coil 27 in the tank 25 to maintain the liquor therein at an elevated temperature, preferably between 180 and 200° F. The maintenance of this elevated temperature is advantageous for several reasons, including the prevention of proteolysis by the enzymes which are thermophobe in character, and the general expediting of the chemical reactions which it is desired to take place. In general I prefer to maintain the press liquor at a temperature not substantially lower than 150° F. throughout all steps prior to coagulation of the proteins and inhibition of enzymolysis in order to prevent any substantial proteolysis in the uninhibited liquor.

I then add to the contents of the tank 25 a precipitating reagent from the tank 30. Such a reagent may be any of the chemicals adapted to precipitate proteins, such as the aluminum sulphate, any of the alums, ferric chloride, tannic acid, and the like. In practice, however, I find sulphuric acid to be a very effective and very cheap reagent. In general, precipitants of an acidic reaction constitute the preferred reagent for this step not only in view of their efficacy in precipitating the undesirable proteins and preventing enzymolysis, but also in view of the fact that it is desirable to have a slightly acidic solution for the subsequent steps of adsorption and/or evaporation. However, for the purpose of precipitating the readily coagulable proteins and preventing enzymolysis, it is not essential that the chemical coagulant used have an acidic reaction.

Only a small amount of chemical coagulant is necessary to obtain the desired precipitation. When using aluminum sulphate, usually from a quarter to one per cent. will suffice. A criterion useful in indicating when sufficient aluminum sulphate has been added is the pH value of the aqueous solution. The pH of the press liquor is usually around 7 or slightly above. The addition of aluminum sulphate to bring the pH down to about 5 results in optimum precipitation.

I find that in using sulphuric acid the quantity is best adjusted to give a pH of about 4.5 in the treated solution. The optimum pH thus varies slightly with the character of the coagulant, but in general when using a strongly acidic coagulant I prefer to add it in an amount sufficient to bring the pH of the treated solution within the range of about 4 to 5.

In commercial practice I prefer to employ sulphuric acid, which I introduce into the tank 25 at a slow steady rate while the contents of the tank are being agitated by means of the agitator 26, thereby avoiding any local over-acidification which might tend to injure the color of the subsequently recovered oil.

When the contents of the tank 25 have been brought to a pH of about 5 by the addition of sulphuric acid, the readily coagulable proteins, including the protein serving to stabilize the emulsified oil, will have been coagulated or precipitated. The mixture at this stage thus comprises a slightly acidic aqueous solution containing in free or unstabilized suspension an oil of lower density than the water and a coagulum of proteinaceous material having a density slightly in excess of the aqueous solution.

The oil in the treated press liquor thus rendered free by the action of the coagulant is susceptible to various gravitational separatory operations, such as settling or centrifuging, being most rapidly and completely removed however by centrifuging. This is in marked distinction to the non-susceptibility of the emulsified oil to separation by centrifuging prior to the step of coagulation.

The dense coagulum may also be removed by centrifuging or settling at the same time the oil is removed, provided equipment adapted to separate heavy, intermediate, and light density materials as three separate products is employed. In general, however, I prefer to provide individual separatory steps for the removal of the oil and of the coagulum, since I find that the oil is best removed by centrifuging, and the coagulum best removed by filtration.

It is also advisable to separate the oil prior to filtration since, otherwise, it tends to become reassociated with protein coagulum in the filter cake.

The preferred method of operation is illustrated in the drawing, the treated press liquor flowing first to the centrifuge 35 where the light oil is skimmed off and removed through the spout 36, the denser materials comprising the aqueous solution and the protein coagulum being removed by means of the spout 40 and then transferred to the filter 44 where the coagulum is separated and retained on the filter leaves.

The oil thus centrifugally recovered will normally amount to from 5 to 10% of the quantity of oil conventionally recovered in the settling tank and hence serves to increase the overall yield of oil by 5 to 10%, which is sufficient to more than pay for the entire cost of the process. In some instances this additional yield of oil will have a little darker color than the oil obtained in the skimming operation, but introduces no noticeable degradation in color of the skimmed oil when it is blended therewith.

The protein coagulum which amounts to about 2 or 3% of the press liquor treated is similar in its general characteristics to the fish meal constituting the principal product of the fish meal industry, and may be blended directly with the meal to increase the yield thereof.

The filtrate from the filter 44 is a clear sparkling liquor which has been effectively pasteurized by the continued application of heat during the previous steps, and which furthermore displays substantially no tendency toward enzymolysis. It may thus be discharged directly into harbors or rivers without any danger of pollution, but in general such wastage of the treated liquor would be economically unadvisable, due to the very valuable vitamin content thereof.

The vitamins are best recovered as concentrates. In my copending application I describe the concentration of the stabilized liquor by evaporation to a syrup or solid, preferably under vacuum. Such evaporative concentration may also be practiced in connection with the present process, filtrates from the filter 44 being collected in the header 50 and transferred by means of the valve 90 and pipe 91 to an evaporator 92.

However, I have now ascertained that a very much simpler and less expensive process may be employed to recover at least 75% of the vitamin G present in the filtrate, namely, a process of selective adsorption of the vitamins concerned on a solid adsorbing agent; for example, fuller's earth. Such adsorption is best practiced in the presence of a small amount of acid. When a chemical coagulant of acidic reaction, and in particular, sulphuric acid, has been used to precipitate the readily coagulable proteins, I find that the resulting solution with a pH of from about 4.5 to 5 is ideally adapted for the practice of selective adsorption.

When it is desired to practice this latter process the filtrate from the filter 44 is transferred by means of the valve 51 and pipe 52 to the mixing tank 55. The filtrate at this point will still be warm and may be heated or cooled by means of heat exchange coils 57 to bring it to a temperature suitable for maximum adsorption. The liquor is best maintained during this adsorption step at a moderately elevated temperature for example, from 80 to 125° F., but this is not essential.

Various adsorbents may be successfully used for the absorption of the vitamins, such as chars, activated clays, and the like, although as a rule I find that very advantageous results may be obtained by employing fuller's earth.

Sufficient of the fuller's earth should be added to insure an adequate adsorbing surface for the fixation of the vitamin. Usually about ½ to 1% by weight of fuller's earth, based on the weight of the filtrate treated, will suffice to recover about 75% of the vitamin G as an adsorbate.

The desired charge of fuller's earth is added to the mixing tank 55 by means of the feeding device 61 and the contents kept in agitation by means of the agitator 56 during the absorption period. Preferably, a somewhat prolonged period of contact should be provided between the fuller's earth and the filtrate; for example, from one to two hours.

Under the above described conditions the clay adsorbs about 75% of the vitamin G present in the liquor and with the proportions of clay employed this serves to give a final clay-adsorbate mixture containing from 150 to 200 gammas of vitamin G per gram dry weight, together with an appreciable amount of vitamin $B_1$.

The separation of the clay from the spent liquor and its subsequent drying may be practiced according to any convenient method, for example, by settling, decanting the supernatant liquid, and air drying the residual clay. In a continuous process, however, I find it very advantageous to use the illustrated centrifuge and dryer. When the desired adsorption has been completed the mixture of clay and spent liquor is transferred from the mixing tank 55 by means of the pipe 65 to the centrifuge 66, which is of the basket type or any other type suitable for the separation of dense finally divided solids from liquids. The separated clay is removed from the centrifuge by means of the pipe 68 and inasmuch as it is still in a moist condition it is transferred to a dryer 70. The latter device, by the application of mild heat and exposure of the clay to a continuous draft of air, serves to drive off the moisture to any desired degree leaving a substantially dry clay containing as aforesaid from 150 to 200 gammas of vitamin G per dry gram, and an appreciable portion of the anti-neuritic vitamin $B_1$. This material, which I call my vitamin adsorbate, is a merchantable product per se and may, moreover, be directly incorporated in animal diets and the full value of its vitamin content thereby obtained without previously separating the adsorbed vitamins from the clay. If desired, however, the clay may be subjected to any conventional elutriation process to remove the adsorbate and separate it from the clay.

The solution removed from the centrifuge 66 by means of the pipe 67 may be discharged to waste if desired, or employed as a liquid fertilizer, or otherwise utilized. It still contains a large proportion of physiologically and nutritionally valuable materials, including unadsorbed vitamins, hormones, albumens, mineral salts, and other entities to the degree that its further concentration to form a valuable vitamin-containing food supplement may be frequently indicated. Such concentration is most conveniently made by evaporation suitably by transfer of the spent liquor from the pipe 67 through the valve 94 and line 95 and line 91 to the evaporator 92.

While I have described in detail one preferred embodiment of my invention, it will be obvious that various changes and modifications of the described process can be made without departing from the essence of my invention. For example, the settling step as practiced on the original press liquor may be omitted and all of the oil recovered in the centrifuge 35. Alternatively, the centrifuge 35 may be omitted and the oil and coagulum separated together as an oily filter cake from which the oil may later be obtained by expression. Various other modifications will also be apparent to one skilled in the art as practical embodiments of my invention as defined by the scope of the appended claims.

I claim as my invention:

1. A process for treating press liquor of the character described comprising: removing free oil from the expressed liquor; adding an acidic coagulant to the liquor to decrease the pH thereof to about 4 or 5, whereby readily coagulable protein material is coagulated and further oil is freed and made susceptible to removal by gravitational separation; separating the oil thus freed; separating the coagulated protein material to produce a clarified serum; and contacting said serum with a solid adsorptive agent to absorb therefrom water soluble vitamins.

2. A process for treating fish press liquor, comprising: removing free oil from the expressed liquor; adding an acid coagulant to the liquor to produce a pH value between about 4 and about 5, whereby readily coagulable protein material is coagulated; separating any oil thus freed to leave a liquor; and concentrating the resultant liquor to produce a concentrate rich in vitamins.

3. A process for treating press liquor of the character described, comprising: removing free oil; adding a small amount of acid to lower the pH to 4 or 5, whereby protein material is coagulated and further oil freed; centrifuging the acidified liquor to remove the free oil; filtering the centrifuged liquor to remove the coagulated protein; agitating the filtrate with a small amount of porous adsorptive agent; and recovering the adsorptive agent and associated adsorbate from the liquor, said adsorbate comprising vitamin G.

4. A process for treating press liquor of the character described, comprising: removing free oil; adding a small amount of a chemical coagulant to coagulate readily coagulable proteins and to free further oil; centrifuging the treated liquor to remove the freed oil; filtering the centrifuged liquor to remove coagulated proteins; and recovering water soluble vitamins from the filtrate.

5. A process for treating press liquor expressed from fish at temperatures in excess of 150° F. which comprises: maintaining the press liquor at a temperature above 150° F.; and treating said press liquor with a chemical coagulant to coagulate readily coagulable proteins while at said elevated temperature, whereby the expressed liquor is not cooled substantially below 150° F. in the period intervening between expression and coagulation.

6. A process for treating fish press liquor, comprising: removing free oil; adding a chemical coagulant to coagulate readily coagulable proteins; treating the liquor to remove oil freed by the coagulant; and concentrating the liquor to produce a concentrate containing vitamins.

7. A process according to claim 6 wherein the chemical coagulant is an acid.

8. A process according to claim 6 wherein the chemical coagulant is tannic acid.

SVEN H. LASSEN.

CERTIFICATE OF CORRECTION.

Patent No. 2,372,677.                                                   April 3, 1945.

SVEN H. LASSEN.

It is hereby certified that error appears in the printed specification of the above numbered patent requiring correction as follows: Page 2, first column, line 64, before the word "in" insert --to 210° F.--; page 5, second column, line 6, for "absorb" read --adsorb--; line 21, for "free" read --freed--; and that the said Letters Patent should be read with this correction therein that the same may conform to the record of the case in the Patent Office.

Signed and sealed this 31st day of July, A. D. 1945.

Leslie Frazer (Seal)                                            Acting Commissioner of Patents.